United States Patent [19]

DeChristopher

[11] Patent Number: 4,696,823

[45] Date of Patent: Sep. 29, 1987

[54] METHOD OF MAKING A PIZZA-TYPE PRODUCT OF DOUGH

[75] Inventor: Eugene L. DeChristopher, Belvedere, Calif.

[73] Assignee: Boboli, Inc., San Rafael, Calif.

[21] Appl. No.: 869,374

[22] Filed: Jun. 2, 1986

[51] Int. Cl.⁴ .............................................. A21D 8/02
[52] U.S. Cl. ..................................... 426/496; 426/94; 426/512
[58] Field of Search ............... 426/496, 512, 502, 503, 426/391, 94

[56] References Cited

U.S. PATENT DOCUMENTS 4,464,405  8/1984  DeChristopher .................. 426/512
4,606,923  8/1986  Ricke .................................... 426/94

Primary Examiner—George Yeung
Attorney, Agent, or Firm—T. R. Savoie; S. D. Walker; D. J. Donovan

[57] ABSTRACT

A method of making a pizza-like product including the step of forcing down against a proofed ball of bread-type dough a press having a plurality of downwardly projecting protuberances to press the dough into a relatively flat configuration with a dimpled surface leaving thick portions between indentations for entrapment of gases.

4 Claims, 4 Drawing Figures

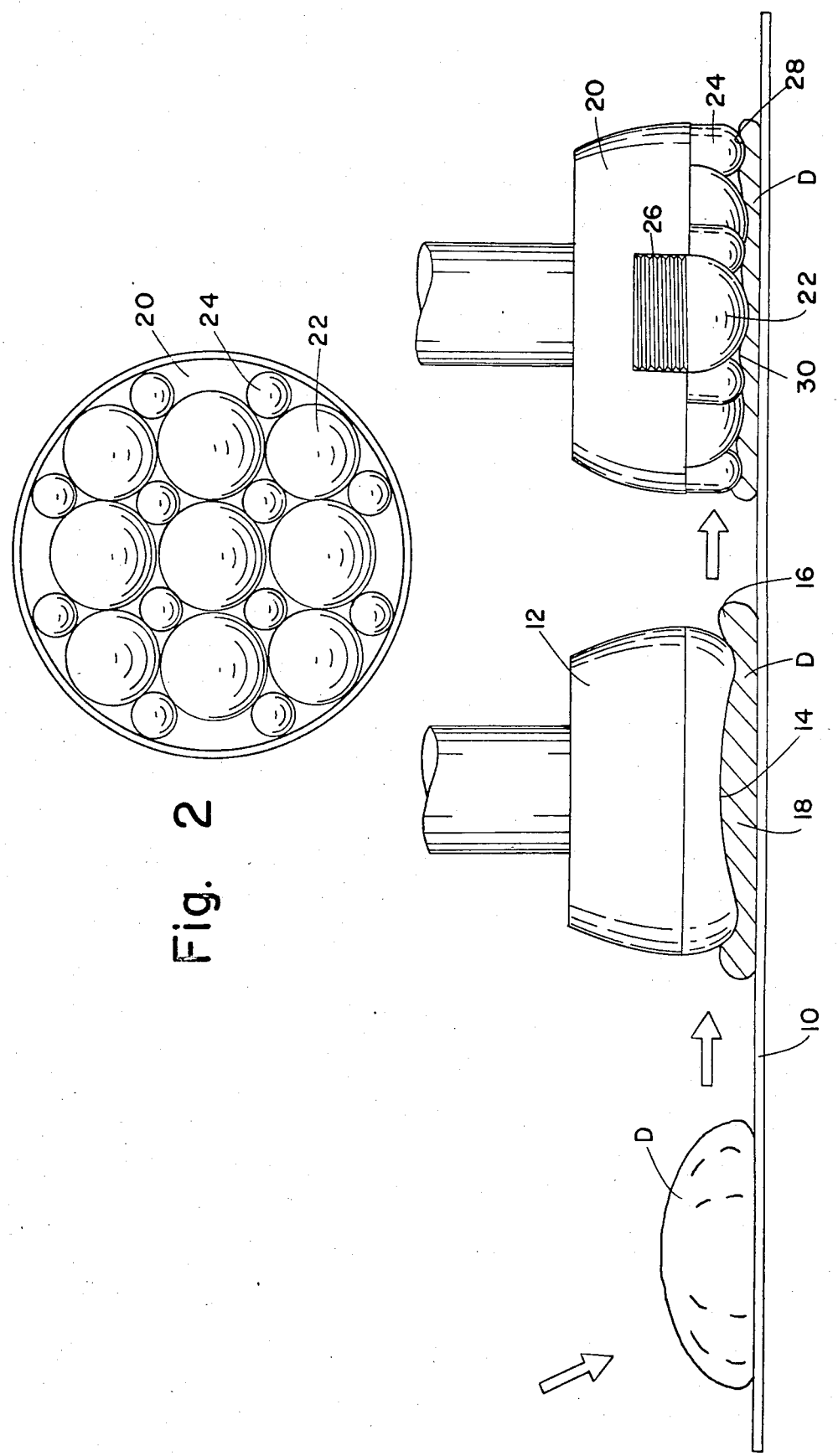

METHOD OF MAKING A PIZZA-TYPE PRODUCT OF DOUGH

BACKGROUND OF THE INVENTION

Very often in making pizza products, the proofed dough is rolled flat to a very thin, sheet-like configuration, leaving no entrapped gases. When baked, the product is flat and tough and unappealing in either appearance or taste. A fluffier, more appealing product resulted from the method described and claimed in my previous U.S. Pat. No. 4,464,405 granted Aug. 7, 1984. The present invention is an improvement to the invention therein shown.

OBJECTS OF THE INVENTION

It is an object of this invention to provide a shell of bread dough which is light and fluffy and appealing in both appearance and taste.

It is a further object of this invention to provide a shell of bread dough that is easily produced without expensive equipment such as sheeters and die cutters.

Other objects and advantages will become apparent from the description of follow, particularly when read in conjunction with the accompanying drawings.

SUMMARY OF THE INVENTION

In carrying out this invention, I provide a method wherein a properly proofed dough ball is pressed relatively flat over a substantial portion of its top surface area, while leaving pockets of unflattened dough wherein gases are entrapped. In one form of the invention, the dough is pressed relatively flat in the central portions thereof, leaving an unflattened peripheral rim with gases trapped therein. Then, a second press with downwardly depending, finger-like protuberances, is pressed over the surface of the dough to provide a plurality of indentations or dimples with rises therebetween containing entrapped gas. In another form of the invention, a sphere of clustered balls is rolled over the surface of the dough to provide dimples in the upper surface thereof.

BRIEF DESCRIPTION OF THE DRAWINGS

In the drawings:

FIG. 1 is an elevation view showing a method of this invention;

FIG. 2 is a bottom view of the finger press;

DESCRIPTION OF PREFERRED EMBODIMENTS

Figure 3:
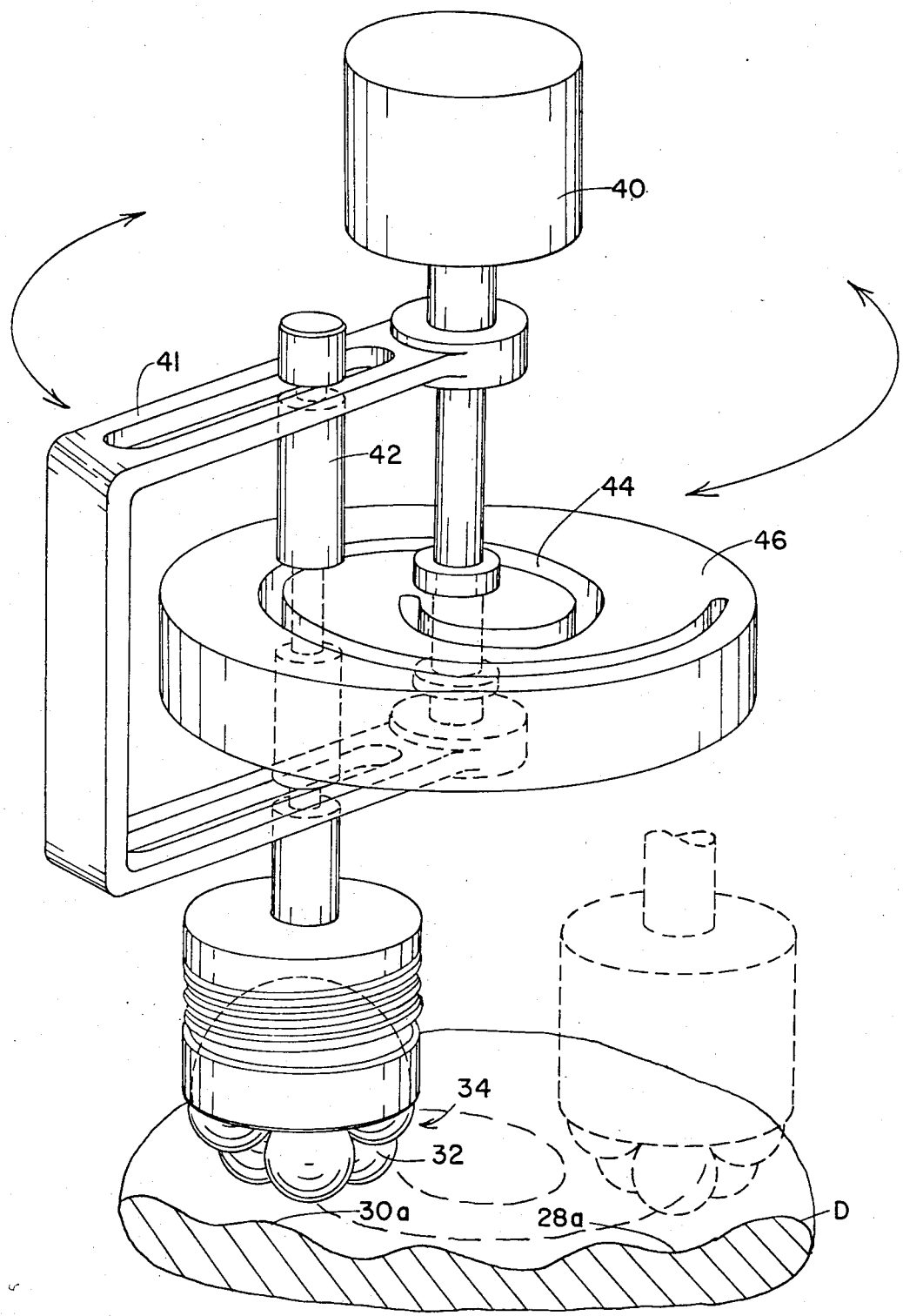
FIG. 3 is a view in perspective showing an apparatus that may be employed in a method of this invention.

The Embodiment of FIGS. 1 and 2

In accordance with this method, a properly proofed ball D of bread-like dough is dropped onto a work table or conveyor 10 on which it is moved under a flattening press 12, which is driven down as by a hydraulic ram (not shown) to compress and flatten the dough ball D. Preferably, the flattening press 12 has a slightly concave bottom surface 14 and it is of a diameter smaller than that of the relatively flat dish of dough to be formed thereby so that there is a peripheral rim 16 of unflattened dough, as well as a thick central portion 18 under the concave surface 14. It is important that the gases be retained in the dough so that the ultimate product will be lighter and fluffier and more appealing. Hence, the gases are not squeezed out, but remain entrapped within the unflattened rim of dough 16 as well as in the relieved central portion 18.

The dough is then moved under a dimpling press 20 that has a series of finger-like protuberances 22 and 24 of various diameters and lengths threaded at 26 or otherwise secured to the dimpling press 20 to depend therefrom. The dimpling press 20 is applied over the full upper surface of the dough D to impress indentations or dimples 28 therein but leaving rises 30 therebetween in which gases remain entrapped. This gives the dough an uneven surface in the nature of a manually formed pizza.

Figure 4:
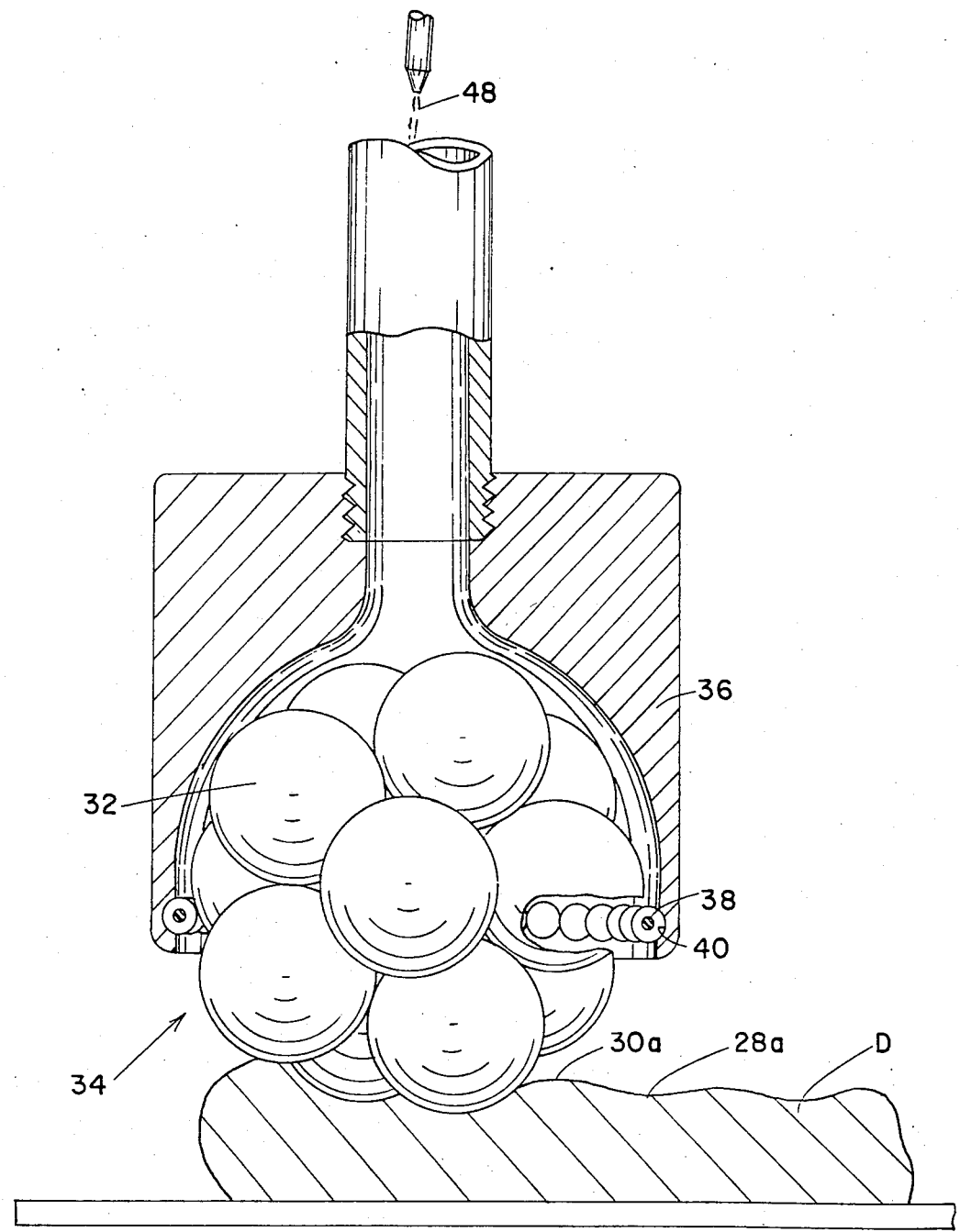
FIG. 4 is an enlarged partial section view of the apparatus of FIG. 3.

The Method of FIGS. 3 and 4

In accordance with this embodiment, a cluster of balls 32 that are adhered together in the general outline of a sphere 34 is rolled over the surface of the dough D to flatten it out while leaving a plurality of dimples 28a and rises 30a. The balls 32 are preferably hollow and made of a suitable plastic, such as Nylon, so that they will be yieldable and not hard and damaging to the dough. The generally spherical cluster 34 is retained within a press holder 36 by suitable means, such as a plurality of beads 38 contained within a groove 40 around the opening of the holder 36.

The spherical dimpler is preferably roller over the dough as by means of a motor 40, which drives radial arms 41 to carry the hollow shaft 42 along a generally spherical path 44 determined by a template 46.

Preferably, as the spherical dimpler is rolled over the dough, drops 48 (FIG. 4) of olive oil or the like are dripped onto the surface of the spherical cluster 34 to be rolled over the surface of the dough.

After the dough is formed as above described it may be flavored with cheeses, herbs and the like and placed in an oven to bake at a selected temperature over 400° F. and for a reasonable period of time, say ten minutes.

While this invention has been described in conjuction with preferred embodiments thereof, it is obvious that modifications and changes therein may be made by those skilled in the art to which it pertains without departing from the spirit and scope of this invention, as defined by the claims appended hereto.

What is claimed as invention is:

1. The method of making a pizza-type product of bread dough comprising the steps of:
   providing a properly proofed, unsheeted dough ball of bread-type dough;
   providing a press with a plurality of downwardly projecting protuberances of various lengths and cross-sections thereon;
   forcing said press down against said dough ball to press it into a thick but relatively flat configuration with a plurality of dimple indentations of irregular size and spacing in the upper surface thereof, leaving rises therebetween for entrapment of gases, and
   placing said dough in a heated oven and baking said dough in said oven.

2. The method defined by claim 1 including the further step of:
   first pressing said dough down firmly over central portions thereof leaving a peripheral rim of relatively unpressed dough with gases trapped therein.

3. The method defined by claim 1 wherein said press comprises:

a plurality of balls clustered and adhered together in the general configuration of a sphere;

said sphere being pressed against said dough by rolling it over the upper surface thereof.

4. The method defined by claim 3 including the step of:

dripping oil on said sphere as it is rolled over said dough.

* * * * *